(12) United States Patent
Maidens et al.

(10) Patent No.: US 11,907,707 B2
(45) Date of Patent: Feb. 20, 2024

(54) METHODS AND SYSTEMS FOR ORCHESTRATING SOFTWARE APPLICATION VARIANT CONFIGURATION (71) Applicant: INTUIT INC., Mountain View, CA (US)

(72) Inventors: Peter Maidens, Edmonton (CA); Parsana Pillay, Bethesda, MD (US); Eric Shenk, Phoenix, AZ (US); Danilo Bangit, Jr., Edmonton (CA); Michael Sharek, Edmonton (CA); James Dutczak, Edmonton (CA); Daniel Huntley, Edmonton (CA)

(73) Assignee: Intuit, Inc., Mountain View, CA (US)

( * ) Notice: Subject to any disclaimer, the term of this patent is extended or adjusted under 35 U.S.C. 154(b) by 59 days.

(21) Appl. No.: 17/589,587

(22) Filed: Jan. 31, 2022

(65) Prior Publication Data
US 2023/0281006 A1 Sep. 7, 2023

(51) Int. Cl.
G06F 9/44 (2018.01)
G06F 11/36 (2006.01)
G06F 8/41 (2018.01)
G06F 9/455 (2018.01)
G06F 8/71 (2018.01)
G06F 8/60 (2018.01)
G06F 8/38 (2018.01)

(52) U.S. Cl.
CPC .............. *G06F 8/71* (2013.01); *G06F 8/38* (2013.01); *G06F 8/60* (2013.01)

(58) Field of Classification Search
CPC ............ G06F 11/3688; G06F 11/3452; G06F 11/3409; G06F 8/60; G06F 11/3684; G06F 8/77; G06F 8/71; G06F 8/38; G06F 18/40; G06F 18/2155; G06F 17/15; G06N 20/00; G06N 7/01; G16H 10/60; G16H 50/30; G16H 50/20
See application file for complete search history.

(56) References Cited

U.S. PATENT DOCUMENTS 8,744,948 B1 * 6/2014 McVickar .............. G06Q 40/12
705/31
2023/0030341 A1 * 2/2023 Koh ...................... G06F 40/186

* cited by examiner

*Primary Examiner* — Thuy Dao
(74) *Attorney, Agent, or Firm* — Patterson + Sheridan, LLP (57) ABSTRACT Certain aspects of the present disclosure provide techniques for configuring a software application through a remote configuration service. An example method generally includes receiving, from a remote configuration service, a declarative construct. Generally, the declarative construct includes a definition of a workflow in an application to be executed within a player application deployed on a client device. Information associated with the definition of the workflow is extracted by parsing the declarative construct according to a schema defining a format of the declarative construct. The workflow is executed in the player application based on the extracted information defining functionality of the workflow.

12 Claims, 4 Drawing Sheets

METHODS AND SYSTEMS FOR ORCHESTRATING SOFTWARE APPLICATION VARIANT CONFIGURATION

INTRODUCTION

Aspects of the present disclosure relate to configuration of software applications, and more specifically to configuring a variant of a software application via an application-agnostic configuration pipeline.

BACKGROUND

Software applications can be consumed on a variety of devices, including desktop computers, laptops, tablets, smartphones, and the like. These applications may be native applications (e.g., applications for which an executable file is built specifically for that platform), web components hosted in a native application, or web applications in which data provided by a user is processed remotely. In many cases, building applications targeting different platforms entails the use of platform-specific code monoliths which include code for generating a user interface and application logic tightly bound to the application logic. In some cases, applications targeting a common platform do not work on every device implementing the common platform, resulting in developers having to write application logic that accommodates different devices on the common platform.

Additionally, many variants of a software application may exist. For example, different variants of a software application may be targeted to different types of users and have different features tailored to user sophistication. A basic variant of an application may include a base set of features that all users of the software application may use, and additional variants may introduce features that are targeted to particular users. Further, different variants of an application may be targeted to users in different geographical regions and thus may use different phraseology, different languages, and the like.

Because software applications may be consumed on various devices and many variants of a software application may exist, code bases may be maintained for each variant of a software application. Maintaining large numbers of code bases may duplicate code, which may impose various complexities and inefficiencies in maintaining and updating software applications. For example, code to fix errors in a software application may need to be propagated across multiple code bases, and code to introduce new features in a software application may be propagated across the code bases for some or all of the variants of the software application. This may entail increased utilization of storage space, increased processor utilization for compiling and deploying variants of a software application, and other increases in computing resource utilization.

Thus, techniques are needed for efficiently deploying variants of software applications.

BRIEF SUMMARY

Certain embodiments provide a computer-implemented method for deploying a variant of a software application through an artifact generation pipeline. An example method generally includes receiving a request for a feature in a software application. The request may include information about a user of the software application. An artifact generation pipeline for the feature of the software application may be retrieved based at least on the information about the user of the software application. The artifact generation pipeline generally includes one or more application-agnostic stages for generating artifacts for a plurality of software applications. An artifact associated with the requested feature is generated using the artifact generation pipeline and a base artifact associated with the requested feature. The generated artifact is deployed.

Still further embodiments provide a computer-implemented method for deploying a variant of a user interface in a software application through an artifact generation pipeline. An example method generally includes receiving a request for a user interface associated with a feature in a software application. The request may include information about a user of the software application. An artifact generation pipeline for the user interface in the software application may be retrieved based at least on the information about the user of the software application. The artifact generation pipeline generally includes one or more application-agnostic stages for generating user interface artifacts for a plurality of software applications. A user interface artifact associated with the feature in the software application is generated using the artifact generation pipeline and a base user interface artifact associated with the requested feature in the software application. The generated user interface artifact is deployed.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

To reduce the amount of code to be maintained in a universe of related applications, software applications may be developed using a "write once, run anywhere" development paradigm. Typically, write once, run anywhere platforms include an interpreter used to execute program code compiled into a common language. While write once, run anywhere platforms allow for the generation and deployment of a single code artifact across different platforms, different code artifacts may still need to be generated for different variations of a workflow and/or different types of devices due to usability differences between the different types of devices (e.g., different user interfaces for desktop, web, and mobile applications, different capabilities of different types of devices, and the like). Because different software artifacts are generated for different variations of a workflow, updating the functionality of these different software artifacts generally entails updating many different software artifacts, debugging these software artifacts, and compiling and deploying these software artifacts to client devices.

Maintaining different variations of software applications may generally involve manually maintaining different application source code bases or using a standalone configuration system to customize an application. For example, a customization engine may be used to configure various experiences within a software application. However, these customization engines may generate significant amounts of network traffic to transfer application source code to a customization engine for customization and execution and to obtain the data needed to execute a variation of a workflow in the software application. In another example, configurations of different variations of a software application may be achieved through the use of predefined configurations for different use cases; however, because these configurations are typically statically defined, the use of predefined configurations may not allow for applications to be dynamically configured. In still another example, data driven personalization services can be used to personalize a software application for a specific user; however, data sources used by these personalization services may be a performance bottleneck, and customizations may be limited to those that are predefined.

Aspects of the present disclosure provide techniques for generating software artifacts implementing various features of a software application through an artifact generation pipeline including one or more application-agnostic stages that may be shared across various software applications. As discussed in further detail herein, the artifact generation pipeline can modify a base artifact defined for a feature of the software application to generate an artifact for a feature of the software application that is appropriate for the user of the software application, the variant of the software application that the user is using and the like. Because these artifacts may be dynamically generated from a base software artifact, aspects of the present disclosure may reduce the amount of computing resources used in maintaining software applications. For example, because software applications deployed on client devices need not be updated in order to implement updated functionality or functionality specific to a particular variant of a software application, processing resources, memory, network bandwidth, and other computing resources need not be used to test, compile, and deploy application binaries to computing devices that have installed a previous version of the software application. Further, because the artifact generation pipeline may include various application-agnostic pipeline stages, these pipeline stages may be shared across different applications to customize various software artifacts (e.g., code, user interface definitions, etc.) in any order that may be desired for an application.

Figure 1:
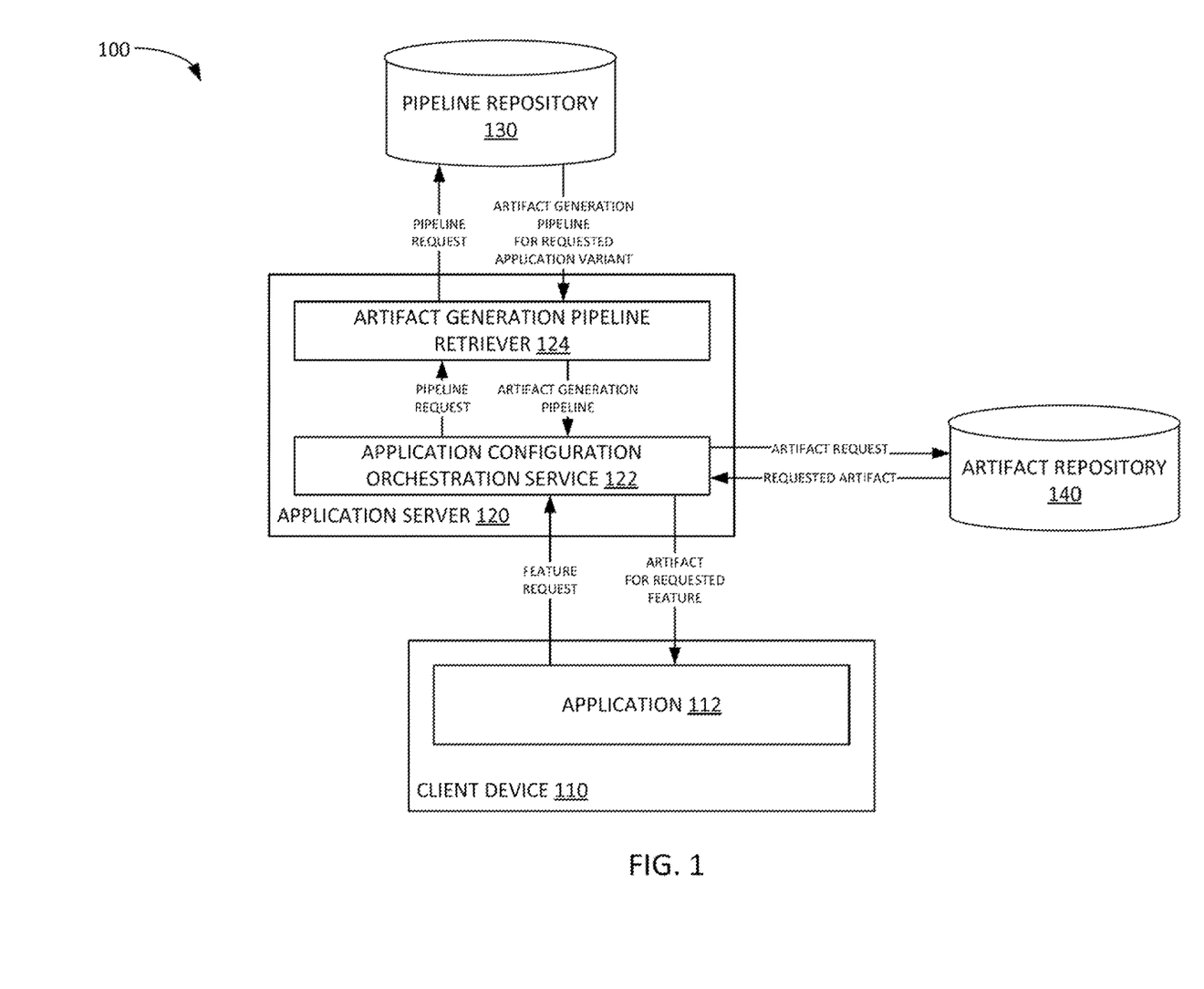
FIG. 1 depicts an example computing environment in which an artifact generation pipeline including application-agnostic stages is used to generate and deploy software artifacts implementing a feature in a software application.

Example Generation of Software Artifacts Through an Artifact Generation Pipeline FIG. 1 illustrates an example computing environment 100 in which an application executing on a client device is remotely configured to implement application functionality using software artifacts generated by an application server through an artifact generation pipeline. As illustrated, computing environment 100 includes a client device 110, an application server 120, a pipeline repository 130, and an artifact repository 140.

Client device 110 is generally representative of a computing device on which a user-facing client application can execute, such as a desktop computer, a laptop computer, a smartphone, a tablet, or other computing device. As illustrated, client device 110 includes an application 112 executing thereon.

Application 112 generally represents an application that allows a user to invoke one or more functions in the software application executing locally or remotely on an application server application server 120 to perform various operations provided by an application. Generally, application 112 may be provisioned with an artifact implementing specific functionality for a variant of a software application so that application 112 application need not be explicitly programmed apriori to execute any specific feature of an application. Generally, application 112 may present a user interface to a user of client device 110 and may execute various functions when defined events occur within the application. In some aspects, application 112 may be a shell application that implements functionality explicitly defined by an artifact with which the application 112 is provisioned. An artifact, as used herein, may include a user interface definition, code implementing one or more functions that can be executed within application 112, or other constructs that define the appearance and/or functionality of application 112. In some aspects, application 112 may include functions for which various parameters are configured by an artifact generated by application server 120. This artifact may be, for example, code implementing a function in a software application, configuration information for a user interface in the software application, or other constructs that can be configured for a specific user of the software application to implement functionality in and/or the appearance of the software application.

To provide application functionality to a user of client device 110, application 112 can request an artifact for a feature in the application 112 from application configuration orchestration service 122 executing at application server 120. In requesting the artifact, application 112 can transmit a feature request to application configuration orchestration server 112. The feature request may include information identifying the requested feature and contextual information that the application configuration orchestration service 122 can use to identify a pipeline for use in generating the artifact and rules for generating the artifact. As discussed in further detail below, the pipeline may include multiple application-agnostic pipeline stages which may be reused across various applications to configure features of various applications.

In some aspects, the contextual information included in a request for an artifact associated with a requested feature of application 112 generated and transmitted by application 112 can include information identifying the user of the player application 112. This information may include, for example, a user name, a unique identifier associated with the user, or the like. Based on this information, application configuration orchestration service 122 can identify a pipeline for generating an artifact for the requested feature and provide the generated artifact to application 112. The identified pipeline, as discussed, may include information identifying a plurality of application-agnostic pipeline stages to use in generating the requested artifact and the order in which the pipeline stages are to be executed. The generated artifact may be associated with a version or variant of the application for which the user of application 112 has a subscription and may include code, user interface definitions, configuration files, and/or other content which may be configured for a specific user of the application 112 according to various user-related parameters. In such a manner, the same application 112 may be used to allow for the configuration and execution of many variations of a same application at execution time, which may reduce the number of software artifacts to be maintained, updated, compiled, and deployed over the lifetime of the software application. Further, because the pipeline stages in the identified pipeline may be application-agnostic, these pipeline stages may be used across various applications instead of being tightly bound to a specific application or a specific version of an application. In some aspects, the contextual information may also or alternatively include information such as an identification of a variant of the application 112, geographic location information, and/or other information that may influence the content of the artifact returned to application 112 from application configuration orchestration service 122.

Application server 120 is generally representative of one or more physical or virtual computing devices on which various applications may be hosted and executed. Application server 120, as illustrated, includes an application configuration orchestration service 122, and an artifact generation pipeline retriever 124.

Generally, application configuration orchestration service 122 receives requests for features in software applications from an application executing on a client device (e.g., application 112 executing on client device 110) and generates an artifact implementing the requested feature of the software application using an artifact generation pipeline and the application-agnostic pipeline stages specified in the artifact generation pipeline. As discussed, the request for a feature in a software application may include contextual information that can be used to generate an artifact implementing the requested feature, such as user information, geographic information, application variant or subscription information, and the like.

To generate the artifact for the requested feature, application configuration orchestration service 122 can request an artifact generation pipeline from artifact generation pipeline retriever 124 and a base definition of the software artifact from artifact repository 140. The request may include the contextual information included in the feature request transmitted from application 112 to application configuration orchestration service 122 and other contextual information that application configuration orchestration service 122 can retrieve from one or more external resources (not illustrated). For example, the feature request received at application configuration orchestration service 122 may include a user identifier. To obtain other contextual information that may be used to identify the proper artifact generation pipeline for the requested feature, application configuration orchestration service 112 can retrieve user information associated with the user identifier from a user data repository. The retrieved user information may include, for example, application subscription information, user role information (e.g., where the functionality of the requested feature and/or appearance of a user interface differs based on a type of the user requesting the feature), geographical information, and the like.

In response to the pipeline request, application configuration orchestration service 122 can receive information identifying an artifact generation pipeline from artifact generation pipeline retriever 124. The artifact generation pipeline may be defined according to a set of application-agnostic pipeline stages that can be used to generate artifacts for any of a plurality of software applications. The pipeline stages may include, for example, a permissions assembler stage, an application version assembler stage, an industry assembler stage, a location assembler stage, and other stages that may be used to generate an artifact for a requested feature. Generally, the pipeline may specify an order in which the pipeline stages are to be executed in order to generate an artifact for the requested feature of the software application.

Generally, the pipeline stages may be configured to modify an artifact based on matching textual strings in a textual definition of a software artifact by modifying a base artifact using an initial stage of the stages in the artifact generation pipeline and sequentially modifying the artifact through the other stages in the artifact generation pipeline. The textual definition may be, for example, a JavaScript Object Notation (JSON) schema, an Extendible Markup Language (XML) schema, server-executable code, client-executable code, or other content which can be modified prior to execution on application server 120 or a client device 110. For example, a pipeline stage may be configured to add content to the textual definition for the requested feature, remove content from the textual definition for the requested feature, rename content in the textual definition for the requested feature, and the like.

To remove content from the textual definition for the requested feature, a pipeline stage may execute one or more instructions to find specific keywords or other content within the textual definition for the feature. If those specific keywords or other content are found within the textual definition for the feature, those specific keywords or other content may be deleted from an artifact that is to be returned to application 112 for execution and/or display. Similarly, to rename content in the textual definition for the requested feature, a pipeline stage may include various definitions mapping source textual content to replacement textual content. If the source textual content is found in the textual definition for the requested feature, the pipeline stage can replace the source textual content with the associated replacement textual content.

The pipeline stages, as discussed, may be application-agnostic. By defining pipeline stages in terms, for example, of general content to be added, deleted, or replaced from schemas defining artifacts that expose a requested feature in a software application, the pipeline stages may be reused across different applications. That is, the pipeline stages, and the modifications that these pipeline stages can effectuate during execution, may not be bound to specific applications. Thus, application configuration orchestration service 122 may be reused across a universe of applications defined according to various schemas that can be customized for use by a variety of users on a variety of client devices.

As discussed, the artifact generation pipeline may execute sequentially to iteratively generate an artifact for a requested feature from a base artifact associated with the requested feature. The base artifact associated with the requested feature may be retrieved from artifact repository 140 in response to an artifact request transmitted to artifact repository 140 from application configuration orchestration service 122. The base artifact, as discussed, may be a textual definition that defines a software artifact, such as a textual schema or code implementing a feature. The code implementing the feature may be, for example, code that can be executed through just-in-time compilation (in which application code is compiled and executed at application runtime) or interpreted at runtime, such as JavaScript, PUP, Python, or the like.

The artifact that can be generated by application configuration orchestration service 122 using the artifact generation pipeline may include executable code, user interfaces, or other features in a software application. Pipeline stages that modify executable code may, for example, include rules that modify values for one or more parameters (e.g., environment variables, constants, etc. used to execute various functions in the executable code) in the executable code. In another example, the pipeline stages may include information identifying overriding definitions for functions defined in a base artifact. An overriding definition may, for example, include replacement code for one or more functions defined in the base artifact, an overload definition for the function, or the like.

Pipeline stages that modify user interfaces may include rules that modify the appearance of the user interface, when interpreted by application 112 and displayed to a user of the software application via a display device communicatively coupled with client device 110. For example, these rules may change the text displayed to a user, change icons displayed in a user interface, change a color palette used in rendering a user interface, and other properties defining the appearance of the user interface.

In some aspects, application configuration orchestration service 122 can present a questionnaire to a user of the software application to obtain information that allows for a user profile to be generated. This user profile may be used, as discussed, to provide contextual information to application configuration orchestration service 122 and artifact generation pipeline retriever 124 to retrieve the appropriate artifact generation pipeline for the user. The questionnaire may be generated based on its own artifact generation pipeline, which may be configured to generate a questionnaire based at least on a geographic location of the user of the software application and a version of the software application to which the user has subscribed. In some aspects, where a mismatch exists between the geographic location of the user of the software application (which may be included in a feature request and determined based on satellite positioning information obtained by client device 110, geolocation of an Internet Protocol (IP) address associated with client device 110, etc.) and other geographic location information associated with the version of the software application to which the user has subscribed, a location assembler for the questionnaire feature may select the appropriate geographic location according to a defined rule (e.g., setting forth that the geographic location associated with the version of the software application to which the user has subscribed takes precedence over the geographic location of the user) and customize the questionnaire according to the selected geographic location.

After application configuration orchestration service 122 generates the artifact for the requested feature, application configuration orchestration service 122 can output the artifact for execution. For example, the artifact may be output to an application 112 executing on client device 110 in order to display a user interface and implement one or more locally-executable functions within application 112. In another example, the artifact may include server-side executable code and client-side executable code which may be deployed to the appropriate devices in environment 100.

Artifact generation pipeline retriever 124 generally receives a pipeline request from application configuration orchestration service 122 and obtains an artifact generation pipeline for the requested feature of the application based on contextual information included in the pipeline request. The contextual information included in the pipeline request may, for example, include information retrieved from an external source and/or contextual information included in the feature request received at application configuration orchestration service 122 and forwarded to artifact generation pipeline retriever 124. Generally, artifact generation pipeline retriever 124 can search pipeline repository 130 for a pipeline associated with specific contextual information, such as a version or variant of a software application for which an artifact generation pipeline is requested, user contextual information such as information provided through a questionnaire or geographical information associated with client device 110, and the like. In response, artifact generation pipeline retriever 124 may receive information defining the artifact generation pipeline and forward the definition of the artifact generation pipeline to application configuration orchestration service 122 for use in generating an artifact for a requested feature of a software application, as discussed above. The artifact generation pipeline may include information defining each of a plurality of application-agnostic stages in the artifact generation pipeline and an order in which these application-agnostic stages are to be executed.

Figure 2:
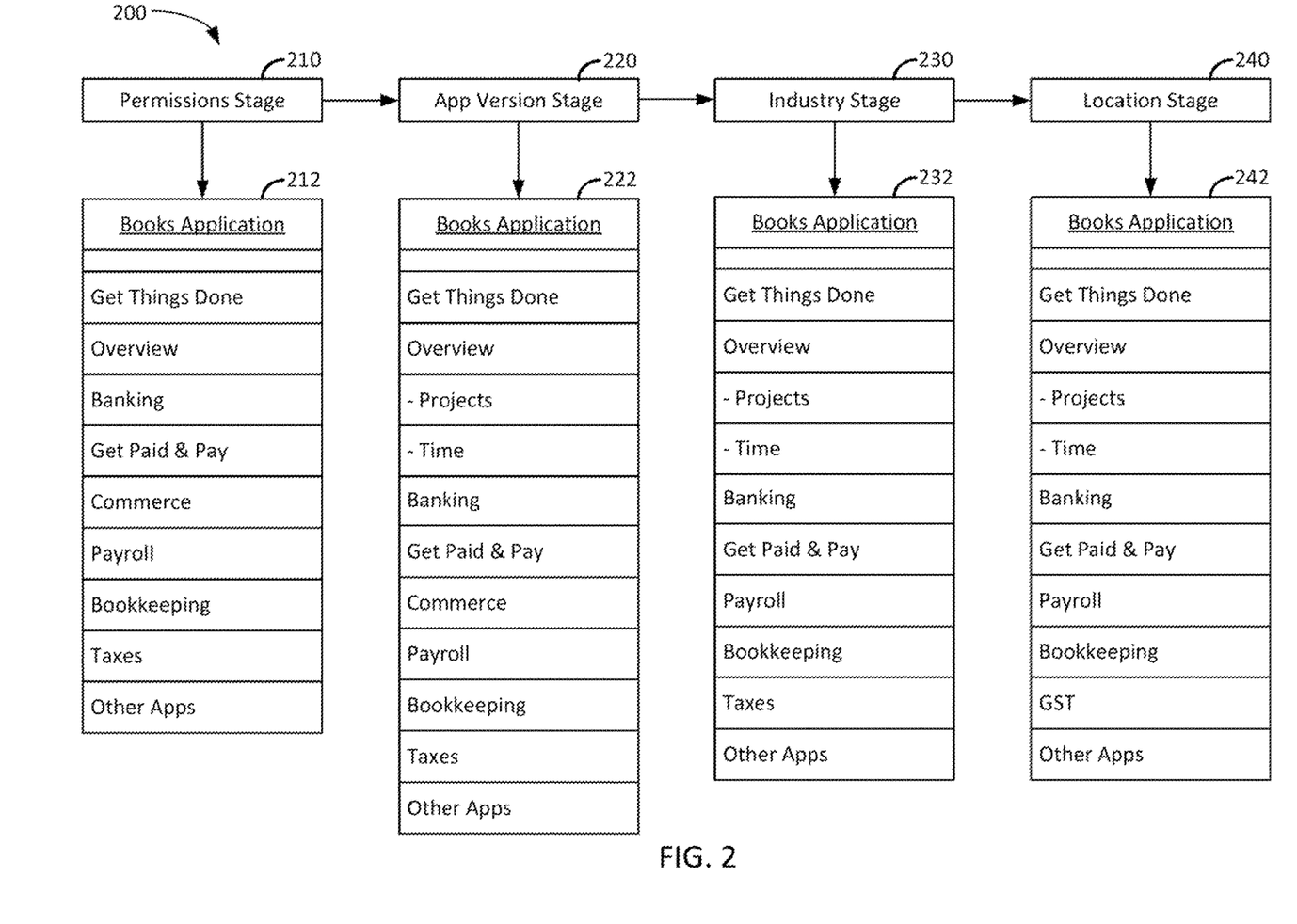
FIG. 2 illustrates an example of an artifact generation pipeline and a feature generated via the artifact generation pipeline.

Example User Interface Artifact Generation Through an Artifact Generation Pipeline FIG. 2 illustrates an example 200 of an artifact generation pipeline and a user interface generated using the artifact generation pipeline, in accordance with certain aspects of the present disclosure.

As illustrate, the artifact generation pipeline includes four stages: a permissions stage 210, application version stage 220, industry stage 230, and location stage 240. It should be understood that these four stages in the order shown in FIG. 2 is only an example, and other stages and other orderings of stages (shown or not shown) may exist. To generate an artifact, such as a user interface, the stages may be executed sequentially. That is, a base artifact may be processed through permissions stage 210, application version stage 220, industry stage 230, and location stage 240 in that order. Each stage can use the artifact generated by a previous stage as input.

The user interfaces 212, 222, 232, and 242 illustrated in FIG. 2 are a menu generated for a specific user of a software application. User interface 212 may be generated from a base definition of the menu user interface artifact at permissions stage 210. In this example, permissions stage 210 can specify that all pages listed in the menu are available to the user of the software application, and thus that no modifications to the base definition of the menu user interface artifact are to be made. Thus, user interface 212 illustrates the base user interface artifact from which modifications can be made.

Application version stage 220 can use the user interface 212 to generate user interface 222. In this example, application version stage 220 can specify one or more additions to the user interface 212 to grant access to additional features in a software application. For example, application version stage 220 can determine, based on information about the variant of the application for which the user has a subscription, that the user should have access to the Projects page and the Time page as sub-items of the Overview menu item.

Industry stage 230 can use the user interface 222 to generate user interface 232. In this example, the industry stage 230 can use contextual information about the user, such as the industry in which the user is using the software application, to modify the menu user interface artifact. Here, the industry stage 230 can determine that the user does not need access to the Commerce feature in the application, and thus, that the menu need not include a link for this Commerce feature. Thus, user interface 232 may be generated by removing the Commerce menu item from user interface 222.

Finally, location stage 240 can use the user interface 232 to generate user interface 242. Here, location stage 240 can use contextual information about the location of the user to modify the menu user interface artifact. In this example, the user may be located in Australia. Based on the user location information, location stage 240 can determine that references to taxes should be replaced by references to GST, as illustrated in user interface 242. The artifact needed to render user interface 242 in an application executing on a client device may be delivered to a client device for interpretation and rendering as the output of the artifact generation pipeline.

Figure 3:
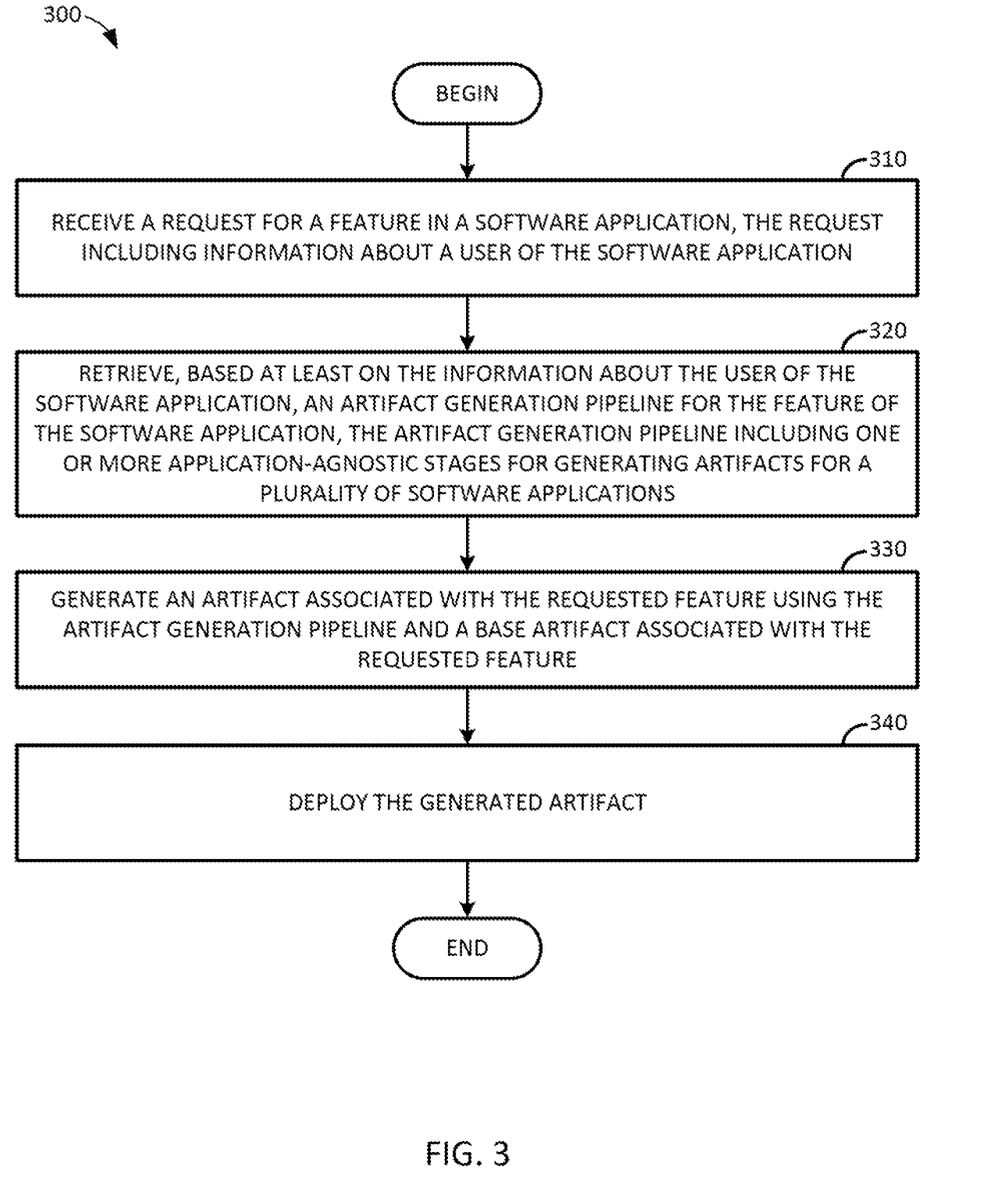
FIG. 3 illustrates example operations for generating an artifact for a feature in a software application using an artifact generation pipeline including one or more application-agnostic stages.

Example Computer-Implemented Method for Generating Software Artifacts Through an Artifact Generation Pipeline FIG. 3 illustrates example operations 300 for generating software artifacts through an artifact generation pipeline. In some cases, operations 300 may be performed by one or more of application configuration orchestration service 122 and/or artifact generation pipeline retriever 124 illustrated in FIG. 1. As discussed, these software artifacts may include user interfaces, configuration information used to render a user interface on a client device, application code to be deployed for execution on a server or a client device using a just-in-time execution scheme, and so on.

As illustrated, operations 300 begin at block 310, where a request for a feature in a software application is received (e.g., at application configuration orchestration service 122 from application 112 illustrated in FIG. 1). Generally, the request includes information identifying the requested feature of the software application and information about a user of the software application. The information about the user of the software application may include, for example, a user identifier from which other contextual information about the user can be obtained (e.g., from a user data repository or other external source), information about the version or variant of a software application to which a user has subscribed, location information associated with the user, and the like.

At block 320, an artifact generation pipeline for the feature of the software application is retrieved. The artifact generation pipeline may be retrieved based at least on the information about the user of the software application. Generally, the artifact generation pipeline includes one or more application-agnostic stages. These application-agnostic stages may not be bound to specific application schemas or specific applications and may be used to generate artifacts for a plurality of software applications. Thus, these application-agnostic stages may be reused at different application servers for generating artifacts for a variety of applications.

In some aspects, the artifact generation pipeline may include an application-agnostic permissions customization stage, an application-agnostic application variant customization stage, and an application-agnostic geographic region customization stage. The permissions customization stage generally uses information about the user to identify the features in the software application for which the user has access (e.g., according to a user role, such as an administrator or a type of non-administrator user). Features in the software application for which the user does not have access may be removed from a base software artifact for the requested feature. The application variant customization stage generally uses information about the variant (or version) of the software application for which the user is subscribed in order to add, remove, or modify features in a software artifact. Finally, the geographic region customization stage uses information about the location of the user (e.g., according to a user profile or device location included in the request for the feature) to add, remove, or modify features in a software artifact.

At block 330, an artifact associated with the requested feature is generated using the artifact generation pipeline and a base artifact associated with the requested feature. Generally, the pipeline may iteratively modify the base artifact associated with the requested feature. A base artifact may be input into a first stage of the artifact generation pipeline. The output of the first stage of the artifact generation pipeline may be used as input into a second stage of the artifact generation pipeline; the output of the second stage of the artifact generation pipeline may be used as input into a third stage of the artifact generation pipeline; and so on, until an artifact is output from a final stage of the artifact generation pipeline.

In some aspects, the artifact associated with the requested feature may be a user interface element. Generating the artifact may include iteratively modifying content in a base user interface element for the requested feature based on rules defining an appearance of the user interface element in each stage of the artifact generation pipeline. For example, the modifications may include adding additional user interface components to support additional features relative to a base version of the software application, removing user interface components associated with unsupported features of the software application for the user of the software application, and modifying the appearance of various user interface components based on various customizations expected to be made for user in specific locations, roles, etc.

In some aspects, the artifact associated with the requested feature may include code implementing the requested feature. This code may, for example, be code written in a language that supports just-in-time compilation or interpretation so that modifications to the code can be executed without needing to compile the code apriori into a new binary. To generate the artifact, content in a base code artifact may be modified using the artifact generation pipeline. As discussed, the artifact generation pipeline can iteratively modify the base code artifact. The content in the base code artifact may be modified according to rules defining values of one or more parameters for the requested feature in each stage of the artifact generation pipeline. These parameter may include global variables, global constants, code implementing a specific function (e.g., to account for regional variations in how the specific function should be implemented, such as tax calculation functions for different regions in a bookkeeping application), and the like.

At block 340, the generated artifact is deployed. Generally, deploying the generated artifact includes transmitting the generated artifact to another device for execution. For example, the artifact may be transmitted to an application executing on a client device (e.g., application 112 executing on client device 110 in FIG. 1) in order to implement the requested feature. In another example, the artifact may be transmitted to an application server for implementation and provisioning to a client device through a web interface.

In some aspects, the information about the user of the software application may include a user profile. To generate the user profile, a questionnaire may be presented to the user of the software application (e.g., upon first user of the software application, registration, etc.). The questionnaire may be generated based on a second artifact generation pipeline, which may be associated with the questionnaire feature in an application and may include one or more stages that modifies a base definition of the questionnaire. A response to the questionnaire may be received, and the user profile may be generated based on the received response. In some aspects, the second artifact generation pipeline may include a pipeline configured to request information based at least on a geographic location of the user of the software application and a version of the software application to which the user has subscribed. That is, the second artifact generation pipeline may include a geographic region customization stage and an application variant customization stage used to determine which questions to present to the user of the software application in the questionnaire.

Figure 4:
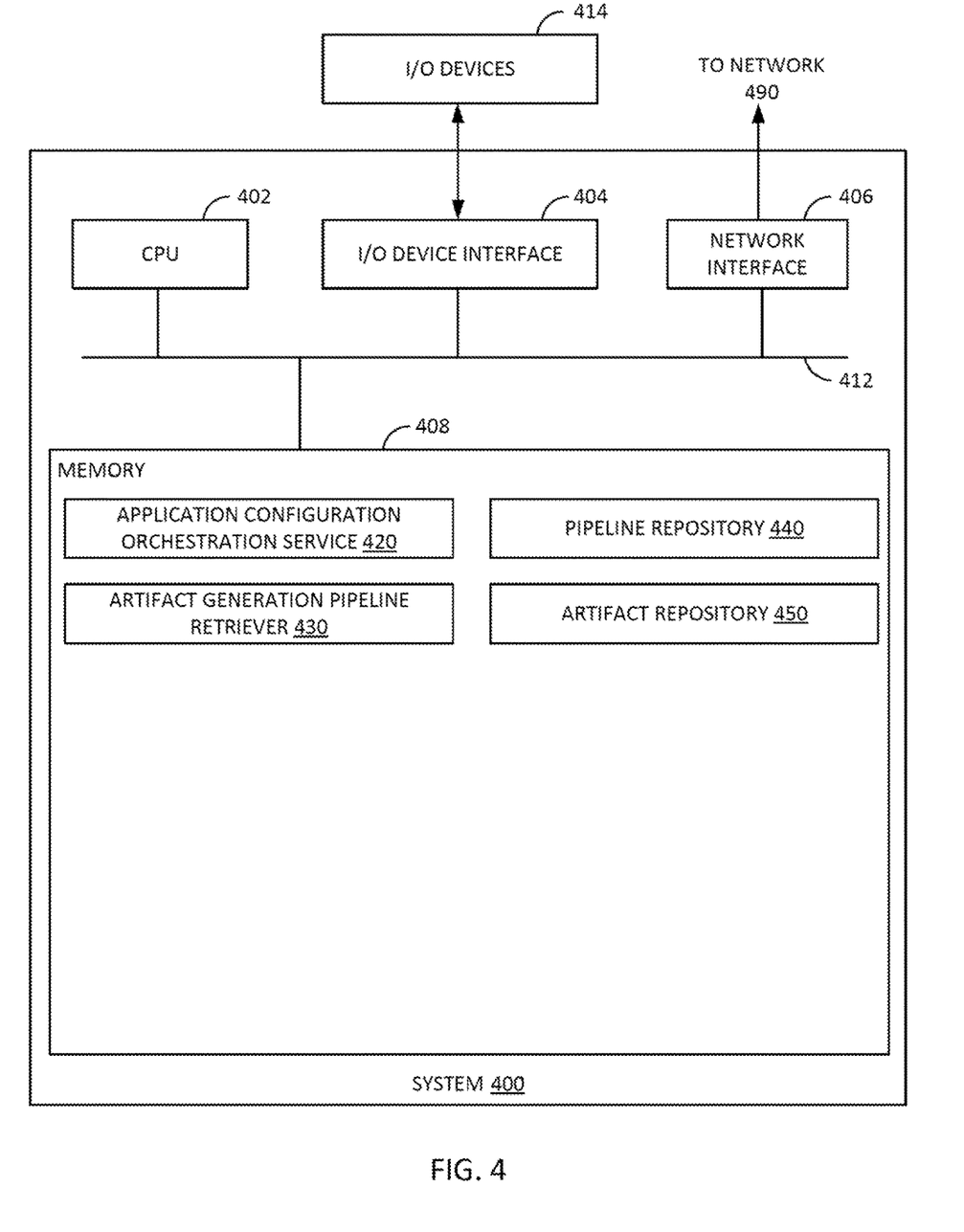
FIG. 4 an example system on which embodiments of the present disclosure can be performed.

Example Systems for Generating Software Artifacts Through an Artifact Generation Pipeline FIG. 4 illustrates an example system 400 in which artifacts for features of a software application are generated through an artifact generation pipeline including one or more application-agnostic pipeline stages. System 400 may correspond to application server 120 illustrated in FIG. 1.

As shown, system 400 includes a central processing unit (CPU) 402, one or more I/O device interfaces 404 that may allow for the connection of various I/O devices 414 (e.g., keyboards, displays, mouse devices, pen input, etc.) to the system 400, network interface 406 through which system 400 is connected to network 490 (which may be a local network, an intranet, the internet, or any other group of computing devices communicatively connected to each other), a memory 408, and an interconnect 412.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, and memory 408.

CPU 402 is included to be representative of a single CPU, multiple CPUs, a single CPU having multiple processing cores, and the like.

Memory 408 is representative of a volatile memory, such as a random access memory, or a nonvolatile memory, such as nonvolatile random access memory, phase change random access memory, or the like. As shown, memory 408 includes an application configuration orchestration service 420, artifact generation pipeline retriever 430, pipeline repository 440, and artifact repository 450.

Application configuration orchestration service 420 may correspond to application configuration orchestration service 122 illustrated in FIG. 1. Generally, application configuration orchestration service 420 can receive a request for a feature in a software application from an application executing on a remote system. Based on contextual information associated with the request, such as the identity of the user of the user, geographic information, and the like, application configuration orchestration service 420 can request information about an artifact generation pipeline to use in generating the artifact from artifact generation pipeline retriever 124. Using the artifact generation pipeline and a base artifact retrieved from artifact repository 450 (which may correspond to artifact repository 140 illustrated in FIG. 1), application configuration orchestration service 420 can iteratively modify the base artifact by adding, removing, and changing items in the base artifact. Application configuration orchestration service 420 may then output the artifact to the requesting software application for execution.

Artifact generation pipeline retriever 430 generally corresponds to artifact generation pipeline retriever 124 illustrated in FIG. 1. Generally, artifact generation pipeline retriever 430 uses contextual information about the user of the software application, the version of the software application, and the requested feature in the software application to generate an artifact generation pipeline for application configuration orchestration service 420 to use in generating an artifact for the feature. Artifact generation pipeline retriever may retrieve information about each of a plurality of application-agnostic pipeline stages from pipeline repository 440 (which may correspond to pipeline repository 130 illustrated in FIG. 1), order the application-agnostic pipeline stages according to a pipeline definition for the feature of the software application, and output the generated artifact generation pipeline to application configuration orchestration service 122 for use in generating an artifact for the requested feature.

Note that FIG. 4 is just one example of a system, and other systems including fewer, additional, or alternative components are possible consistent with this disclosure.

EXAMPLE CLAUSES

Implementation examples are described in the following numbered clauses:

Clause 1: A method, comprising: receiving a request for a feature in a software application, the request including information about a user of the software application; retrieving, based at least on the information about the user of the software application, an artifact generation pipeline for the feature of the software application, the artifact generation pipeline including one or more application-agnostic stages for generating artifacts for a plurality of software applications; generating an artifact associated with the requested feature using the artifact generation pipeline and a base artifact associated with the requested feature; and deploying the generated artifact.

Clause 2: The method of Clause 1, wherein generating the artifact associated with the requested feature comprises iteratively modifying the base artifact associated with the requested feature through each stage of a plurality of stages defined in the artifact generation pipeline.

Clause 3: The method of any one of Clauses 1 or 2, wherein: the artifact associated with the requested feature comprises a user interface element, and generating the artifact comprises iteratively modifying content in a base user interface element based on rules defining an appearance of the user interface element in each stage of the artifact generation pipeline.

Clause 4: The method of Clause 3, wherein the artifact generation pipeline comprises: a permissions customization stage, an application variant customization stage, and a geographic region customization stage.

Clause 5: The method of any one of Clauses 1 through 4, wherein: the artifact associated with the requested feature comprises code implementing the requested feature, and generating the artifact comprises modifying content in a base code artifact based on rules defining values of one or more parameters for the requested feature in each stage of the artifact generation pipeline.

Clause 6: The method of any one of Clauses 1 through 5, wherein the request further includes information identifying a variant of the software application the user to which the user has subscribed.

Clause 7: The method of any one of Clauses 1 through 6, wherein the information about the user of the software application comprises a user profile, and wherein the method further comprises: presenting a questionnaire to the user of the software application, the questionnaire being generated based on a second artifact generation pipeline; receiving a response to the questionnaire; and generating the user profile based on the received response.

Clause 8: The method of Clause 7, wherein the second artifact generation pipeline comprises a pipeline configured to request information based at least on a geographic location of the user of the software application and a version of the software application to which the user has subscribed.

Clause 9: A method, comprising: receiving a request for a user interface associated with a feature in a software application, the request including information about a user of the software application; retrieving, based at least on the information about the user of the software application, an artifact generation pipeline for the user interface in the software application, the artifact generation pipeline including one or more application-agnostic stages for generating user interface artifacts for a plurality of software applications; generating a user interface artifact associated with the feature in the software application using the artifact generation pipeline and a base user interface artifact associated with the feature in the software application; and deploying the generated user interface artifact.

Clause 10: The method of Clause 9, wherein generating the user interface artifact associated with the feature comprises iteratively modifying the base user interface artifact associated with the feature through each stage of a plurality of stages defined in the artifact generation pipeline.

Clause 11: The method of any one of Clauses 9 or 10, further comprising generating code implementing the feature in the software application using the artifact generation pipeline.

Clause 12: The method of Clause 11, wherein generating the code implementing the feature in the software application comprises modifying content in a base code artifact associated with the feature based on rules defining values of one or more parameters for the feature in each stage of the artifact generation pipeline.

Clause 13: A system, comprising: a memory having executable instructions stored thereon; and a processor configured to execute the executable instructions to perform the methods of any one of Clauses 1 through 12.

Clause 14: A system, comprising: means for performing the methods of any one of Clauses 1 through 12.

Clause 15: A computer-readable medium having instructions stored thereon which, when executed by a processor, performs the methods of any one of Clauses 1 through 12.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving a request for a user interface associated with a feature in a software application, the request including information about a user of the software application;
   retrieving, based at least on the information about the user of the software application, an artifact generation pipeline for the user interface in the software application, the artifact generation pipeline including one or more application-agnostic stages for generating user interface artifacts for a plurality of software applications;
   generating a generated user interface artifact associated with the feature using the artifact generation pipeline and a base artifact associated with the feature; and
   deploying the generated user interface artifact.

2. The method of claim 1, wherein generating the generated user interface artifact associated with the feature comprises iteratively modifying the base artifact associated with the feature through each stage of a plurality of stages defined in the artifact generation pipeline.

3. The method of claim 1, wherein:
   the generated user interface artifact comprises code implementing the feature, and
   generating the generated user interface artifact comprises modifying content in a base code artifact based on rules defining values of one or more parameters for the feature in each stage of the artifact generation pipeline.

4. The method of claim 1, wherein the request further includes information identifying a variant of the software application to which the user has subscribed.

5. A method, comprising:
receiving a request for a feature in a software application, the request including information about a user of the software application;
retrieving, based at least on the information about the user of the software application, an artifact generation pipeline for the feature of the software application, the artifact generation pipeline including one or more application-agnostic stages for generating artifacts for a plurality of software applications;
generating an artifact associated with the feature using the artifact generation pipeline and a base artifact associated with the feature; and
deploying the artifact; wherein
the artifact associated with the feature comprises a user interface element;
generating the artifact comprises iteratively modifying content in a base user interface element based on rules defining an appearance of the user interface element in each stage of the artifact generation pipeline; and
the artifact generation pipeline comprises:
a permissions customization stage,
an application variant customization stage, and
a geographic region customization stage.

6. A method, comprising:
receiving a request for a feature in a software application, the request including information about a user of the software application, the information comprising a user profile;
retrieving, based at least on the information about the user of the software application, an artifact generation pipeline for the feature of the software application, the artifact generation pipeline including one or more application-agnostic stages for generating artifacts for a plurality of software applications;
generating an artifact associated with the feature using the artifact generation pipeline and a base artifact associated with the feature; and
deploying the artifact;
presenting a questionnaire to the user of the software application, the questionnaire being generated based on a second artifact generation pipeline;
receiving a response to the questionnaire; and
generating the user profile based on the response; wherein the second artifact generation pipeline comprises a pipeline configured to request information based at least on a geographic location of the user of the software application and a version of the software application to which the user has subscribed.

7. A system, comprising:
a memory having executable instructions stored thereon; and
a processor configured to execute the executable instructions to cause the system to:
receive a request for a user interface associated with a feature in a software application, the request including information about a user of the software application;
retrieve, based at least on the information about the user of the software application, an artifact generation pipeline for the user interface in the software application, the artifact generation pipeline including one or more application-agnostic stages for generating user interface artifacts for a plurality of software applications;
generate a generated user interface artifact associated with the feature using the artifact generation pipeline and a base artifact associated with the feature; and
deploy the generated user interface artifact.

8. The system of claim 7, wherein in order to generate the generated user interface artifact associated with the feature, the processor is configured to iteratively modify the base artifact associated with the feature through each stage of a plurality of stages defined in the artifact generation pipeline.

9. The system of claim 7, wherein:
the generated user interface artifact associated with the feature comprises code implementing the feature, and
in order to generate the user generated interface artifact, the processor is configured to modify content in a base code artifact based on rules defining values of one or more parameters for the feature in each stage of the artifact generation pipeline.

10. The system of claim 7, wherein the request further includes information identifying a variant of the software application to which the user has subscribed.

11. A method, comprising:
receiving a request for a feature in a software application, the request including information about a user of the software application;
retrieving, based at least on the information about the user of the software application, an artifact generation pipeline for the feature of the software application, the artifact generation pipeline including one or more application-agnostic stages for generating artifacts for a plurality of software applications;
generating an artifact associated with the feature using the artifact generation pipeline and a base artifact associated with the feature; and
deploying the artifact; wherein
the artifact associated with the feature comprises a user interface element;
generating the artifact comprises iteratively modifying content in a base user interface element based on rules defining an appearance of the user interface element in each stage of the artifact generation pipeline; and
the artifact generation pipeline comprises:
a permissions customization stage,
an application variant customization stage, and
a geographic region customization stage.

12. A method, comprising:
receiving a request for a feature in a software application, the request including information about a user of the software application, the information comprising a user profile;
retrieving, based at least on the information about the user of the software application, an artifact generation pipeline for the feature of the software application, the artifact generation pipeline including one or more application-agnostic stages for generating artifacts for a plurality of software applications;
generating an artifact associated with the feature using the artifact generation pipeline and a base artifact associated with the feature; and
deploying the artifact;
presenting a questionnaire to the user of the software application, the questionnaire being generated based on a second artifact generation pipeline;
receiving a response to the questionnaire; and
generating the user profile based on the response; wherein the second artifact generation pipeline comprises a pipeline configured to request information based at least on a geographic location of the user of the software application and a version of the software application to which the user has subscribed.

* * * * *